United States Patent
Bortolin et al.

(10) Patent No.: US 8,141,777 B2
(45) Date of Patent: *Mar. 27, 2012

(54) METHOD AND SYSTEM USING WILDCARD VALUES

(75) Inventors: Corinne Bortolin, Half Moon Bay, CA (US); Loc Duc Nguyen, San Francisco, CA (US); Liane Redford, San Mateo, CA (US)

(73) Assignee: Visa U.S.A. Inc., San Francisco, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/019,244

(22) Filed: Feb. 1, 2011

(65) Prior Publication Data

US 2011/0191155 A1    Aug. 4, 2011

Related U.S. Application Data

(63) Continuation of application No. 12/640,890, filed on Dec. 17, 2009, now Pat. No. 7,900,831, which is a continuation of application No. 11/977,715, filed on Oct. 24, 2007, now Pat. No. 7,654,451, which is a continuation of application No. 11/598,954, filed on Nov. 13, 2006, now Pat. No. 7,367,501, which is a continuation of application No. 11/491,550, filed on Jul. 20, 2006, now Pat. No. 7,350,702, which is a continuation of application No. 10/654,663, filed on Sep. 3, 2003, now Pat. No. 7,104,446.

(51) Int. Cl.
  *G06K 15/00* (2006.01)

(52) U.S. Cl. ........................................ 235/380; 235/383

(58) Field of Classification Search .................. 235/383, 235/375, 378, 380, 381, 385, 462.01, 462.45; 705/17, 28
See application file for complete search history.

(56) References Cited

U.S. PATENT DOCUMENTS

| | | | |
|---|---|---|---|
| 3,935,933 A | 2/1976 | Tanaka et al. |
| 4,011,433 A | 3/1977 | Tateisi et al. |
| 4,108,350 A | 8/1978 | Forbes, Jr. |
| 4,124,109 A | 11/1978 | Bissell et al. |

(Continued)

FOREIGN PATENT DOCUMENTS

AU     200039412     12/2000

(Continued)

OTHER PUBLICATIONS

"Internet based secure transactions using encrypting applets and cgi-scripts Independent of browser or server capabilities"; 1998, IBM Research Disclosure, No. 410116, pp. 800-801.

*Primary Examiner* — Daniel St. Cyr
(74) *Attorney, Agent, or Firm* — Kilpatrick Townsend & Stockton LLP

(57) ABSTRACT

A method of processing data on a server computer is disclosed. The method includes receiving data at the server computer, the data including a first data string including one or more wildcard values. The first data string is specifically associated with a customer, and the one or more wildcard values are associated with the purchase transaction. The method also includes comparing the first data string to a second data string by the server computer, and providing an output to the consumer based on the comparison.

20 Claims, 10 Drawing Sheets

U.S. PATENT DOCUMENTS

| | | |
|---|---|---|
| 4,195,864 A | 4/1980 | Morton et al. |
| 4,412,631 A * | 11/1983 | Haker .............................. 221/66 |
| 4,544,590 A * | 10/1985 | Egan ............................ 428/41.4 |
| 4,568,403 A * | 2/1986 | Egan ............................. 156/247 |
| 4,674,041 A | 6/1987 | Lemon et al. |
| 4,723,212 A | 2/1988 | Mindrum et al. |
| 4,742,215 A | 5/1988 | Daughters et al. |
| 4,794,530 A | 12/1988 | Yukiura et al. |
| 4,825,053 A | 4/1989 | Caille |
| 4,837,422 A | 6/1989 | Dethloff et al. |
| 4,841,712 A | 6/1989 | Roou |
| 4,868,376 A | 9/1989 | Lessin et al. |
| 4,882,675 A | 11/1989 | Nichtberger et al. |
| 4,910,672 A | 3/1990 | Off et al. |
| 4,930,129 A | 5/1990 | Takahira |
| 4,941,090 A | 7/1990 | McCarthy |
| 4,949,256 A | 8/1990 | Humble |
| 4,954,003 A | 9/1990 | Shea |
| 4,985,615 A | 1/1991 | Iijima |
| 4,992,940 A | 2/1991 | Dworkin |
| 5,019,452 A | 5/1991 | Watanabe et al. |
| 5,019,695 A | 5/1991 | Itako |
| 5,025,372 A | 6/1991 | Burton et al. |
| 5,056,019 A | 10/1991 | Schultz et al. |
| 5,060,793 A | 10/1991 | Hyun et al. |
| 5,060,804 A | 10/1991 | Beales et al. |
| 5,063,596 A | 11/1991 | Dyke |
| 5,115,888 A | 5/1992 | Schneider |
| 5,117,355 A | 5/1992 | McCarthy |
| 5,128,752 A | 7/1992 | Von Kohorn |
| 5,161,256 A | 11/1992 | Iijima |
| 5,173,851 A | 12/1992 | Off et al. |
| 5,185,695 A | 2/1993 | Pruchnicki |
| 5,200,889 A | 4/1993 | Mori |
| 5,202,826 A | 4/1993 | McCarthy |
| 5,227,874 A | 7/1993 | Von Kohorn |
| 5,250,789 A | 10/1993 | Johnsen |
| 5,256,863 A | 10/1993 | Ferguson et al. |
| 5,285,278 A | 2/1994 | Holman |
| 5,287,181 A | 2/1994 | Holman |
| 5,287,268 A | 2/1994 | McCarthy |
| 5,299,834 A | 4/1994 | Kraige |
| 5,308,120 A | 5/1994 | Thompson |
| 5,353,218 A | 10/1994 | De Lapa et al. |
| 5,380,991 A | 1/1995 | Valencia et al. |
| RE34,915 E | 4/1995 | Nichtberger et al. |
| 5,402,549 A | 4/1995 | Forrest |
| 5,417,458 A | 5/1995 | Best et al. |
| 5,420,606 A | 5/1995 | Begum et al. |
| 5,450,938 A | 9/1995 | Rademacher |
| 5,465,206 A | 11/1995 | Hilt et al. |
| 5,466,010 A | 11/1995 | Spooner |
| 5,471,669 A | 11/1995 | Lidman |
| 5,473,690 A | 12/1995 | Grimonprez et al. |
| 5,477,038 A | 12/1995 | Levine et al. |
| 5,483,444 A | 1/1996 | Heintzeman et al. |
| 5,484,998 A | 1/1996 | Bejnar et al. |
| 5,491,326 A | 2/1996 | Marceau et al. |
| 5,491,838 A | 2/1996 | Takahisa et al. |
| 5,500,681 A | 3/1996 | Jones |
| 5,501,491 A | 3/1996 | Thompson |
| 5,513,102 A | 4/1996 | Auriemma |
| 5,515,270 A | 5/1996 | Weinblatt |
| 5,530,232 A | 6/1996 | Taylor |
| 5,531,482 A | 7/1996 | Blank |
| 5,535,118 A | 7/1996 | Chumbley |
| 5,537,314 A | 7/1996 | Kanter |
| 5,559,313 A | 9/1996 | Claus et al. |
| 5,564,073 A | 10/1996 | Takahisa |
| 5,577,266 A | 11/1996 | Takahisa et al. |
| 5,577,915 A | 11/1996 | Feldman |
| 5,578,808 A | 11/1996 | Taylor |
| 5,579,537 A | 11/1996 | Takahisa |
| 5,594,493 A | 1/1997 | Nemirofsky |
| 5,612,868 A | 3/1997 | Off et al. |
| 5,621,201 A | 4/1997 | Langhans et al. |
| 5,621,812 A | 4/1997 | Deaton et al. |
| 5,642,485 A | 6/1997 | Deaton et al. |
| 5,644,723 A | 7/1997 | Deaton et al. |
| 5,649,114 A | 7/1997 | Deaton et al. |
| 5,649,118 A | 7/1997 | Carlisle et al. |
| 5,650,209 A | 7/1997 | Ramsburg et al. |
| 5,687,322 A | 11/1997 | Deaton et al. |
| 5,689,100 A | 11/1997 | Carrithers et al. |
| 5,710,886 A | 1/1998 | Christensen et al. |
| 5,727,153 A | 3/1998 | Powell |
| 5,734,838 A | 3/1998 | Robinson et al. |
| 5,742,845 A | 4/1998 | Wagner |
| 5,754,762 A | 5/1998 | Kuo et al. |
| 5,761,648 A | 6/1998 | Golden et al. |
| 5,765,141 A | 6/1998 | Spector |
| 5,767,896 A | 6/1998 | Nemirofsky |
| 5,774,870 A | 6/1998 | Storey |
| 5,776,287 A | 7/1998 | Best et al. |
| 5,791,991 A | 8/1998 | Small |
| 5,794,210 A | 8/1998 | Goldhaber et al. |
| 5,797,126 A | 8/1998 | Helbling et al. |
| 5,802,519 A | 9/1998 | De Jong |
| 5,804,806 A | 9/1998 | Haddad et al. |
| 5,806,044 A | 9/1998 | Powell |
| 5,806,045 A | 9/1998 | Biorge et al. |
| 5,815,658 A | 9/1998 | Kuriyama |
| 5,822,735 A | 10/1998 | De Lapa et al. |
| 5,822,737 A | 10/1998 | Ogram |
| 5,832,457 A | 11/1998 | O'Brien et al. |
| 5,844,218 A | 12/1998 | Kawan et al. |
| 5,845,259 A | 12/1998 | West et al. |
| 5,855,007 A | 12/1998 | Jovicic et al. |
| 5,857,175 A | 1/1999 | Day et al. |
| 5,859,419 A | 1/1999 | Wynn |
| RE36,116 E | 2/1999 | McCarthy |
| 5,865,340 A | 2/1999 | Alvern |
| 5,865,470 A | 2/1999 | Thompson |
| 5,868,498 A | 2/1999 | Martin |
| 5,880,769 A | 3/1999 | Nemirofsky et al. |
| 5,884,271 A | 3/1999 | Pitroda |
| 5,884,277 A | 3/1999 | Khosla |
| 5,884,278 A | 3/1999 | Powell |
| 5,887,271 A | 3/1999 | Powell |
| 5,890,135 A | 3/1999 | Powell |
| 5,892,827 A | 4/1999 | Beach et al. |
| 5,898,838 A | 4/1999 | Wagner |
| 5,903,732 A | 5/1999 | Reed et al. |
| 5,905,246 A | 5/1999 | Fajkowski |
| 5,905,908 A | 5/1999 | Wagner |
| 5,907,350 A | 5/1999 | Nemirofsky |
| 5,907,830 A | 5/1999 | Engel et al. |
| 5,909,486 A | 6/1999 | Walker et al. |
| 5,912,453 A | 6/1999 | Gungl et al. |
| 5,915,244 A | 6/1999 | Jack et al. |
| 5,923,884 A | 7/1999 | Peyret et al. |
| 5,924,072 A | 7/1999 | Havens |
| 5,926,795 A | 7/1999 | Williams |
| 5,928,082 A | 7/1999 | Clapper, Jr. |
| 5,931,947 A | 8/1999 | Burns et al. |
| 5,943,651 A | 8/1999 | Oosawa |
| 5,950,173 A | 9/1999 | Perkowski |
| 5,953,047 A | 9/1999 | Nemirofsky |
| 5,953,705 A | 9/1999 | Oneda |
| 5,956,694 A | 9/1999 | Powell |
| 5,956,695 A | 9/1999 | Carrithers et al. |
| 5,958,174 A | 9/1999 | Ramsberg et al. |
| 5,960,082 A | 9/1999 | Haenel |
| 5,963,917 A | 10/1999 | Ogram |
| 5,969,318 A | 10/1999 | Mackenthun |
| 5,970,469 A | 10/1999 | Scroggie et al. |
| 5,974,399 A | 10/1999 | Giuliani et al. |
| 5,974,549 A | 10/1999 | Golan |
| 5,978,013 A | 11/1999 | Jones et al. |
| 5,987,795 A | 11/1999 | Wilson |
| 5,997,042 A | 12/1999 | Blank |
| 6,000,608 A | 12/1999 | Dorf |
| 6,002,771 A | 12/1999 | Nielsen |
| 6,003,113 A | 12/1999 | Hoshino |
| 6,003,134 A | 12/1999 | Kuo et al. |
| 6,005,942 A | 12/1999 | Chan et al. |
| 6,009,411 A | 12/1999 | Kepecs |

| | | |
|---|---|---|
| 6,012,635 A | 1/2000 | Shimada et al. |
| 6,014,634 A | 1/2000 | Scroggie et al. |
| 6,024,281 A | 2/2000 | Shepley |
| 6,024,286 A | 2/2000 | Bradley et al. |
| 6,035,280 A | 3/2000 | Christensen |
| 6,038,551 A | 3/2000 | Barlow et al. |
| 6,041,309 A | 3/2000 | Laor |
| 6,047,325 A | 4/2000 | Jain et al. |
| 6,049,778 A | 4/2000 | Walker et al. |
| 6,052,468 A | 4/2000 | Hillhouse |
| 6,052,690 A | 4/2000 | de Jong |
| 6,052,785 A | 4/2000 | Lin et al. |
| 6,055,509 A | 4/2000 | Powell |
| 6,055,512 A | 4/2000 | Dean et al. |
| 6,061,660 A | 5/2000 | Eggleston et al. |
| 6,067,526 A | 5/2000 | Powell |
| 6,070,147 A | 5/2000 | Harms et al. |
| 6,073,238 A | 6/2000 | Drupsteen |
| 6,076,068 A | 6/2000 | DeLapa et al. |
| 6,076,069 A | 6/2000 | Laor |
| 6,089,611 A | 7/2000 | Blank |
| 6,094,656 A | 7/2000 | De Jong |
| 6,101,422 A | 8/2000 | Furlong |
| 6,101,477 A | 8/2000 | Hohle et al. |
| 6,105,002 A | 8/2000 | Powell |
| 6,105,865 A | 8/2000 | Hardesty |
| 6,105,873 A | 8/2000 | Jeger |
| 6,112,987 A | 9/2000 | Lambert et al. |
| 6,112,988 A | 9/2000 | Powell |
| 6,119,933 A | 9/2000 | Wong et al. |
| 6,119,945 A | 9/2000 | Muller et al. |
| 6,122,631 A | 9/2000 | Berbec et al. |
| 6,123,259 A * | 9/2000 | Ogasawara ................. 235/380 |
| 6,129,274 A | 10/2000 | Suzuki |
| 6,144,948 A | 11/2000 | Walker et al. |
| 6,151,586 A | 11/2000 | Brown |
| 6,151,587 A | 11/2000 | Matthias |
| 6,154,751 A | 11/2000 | Ault et al. |
| 6,161,870 A | 12/2000 | Blank |
| 6,164,549 A | 12/2000 | Richards |
| 6,170,061 B1 | 1/2001 | Beser |
| 6,173,269 B1 | 1/2001 | Solokl et al. |
| 6,173,891 B1 | 1/2001 | Powell |
| 6,179,205 B1 | 1/2001 | Sloan |
| 6,179,710 B1 | 1/2001 | Sawyer et al. |
| 6,183,017 B1 | 2/2001 | Najor et al. |
| 6,185,541 B1 | 2/2001 | Scroggie et al. |
| 6,189,100 B1 | 2/2001 | Barr et al. |
| 6,189,787 B1 | 2/2001 | Dorf |
| 6,195,666 B1 | 2/2001 | Schneck et al. |
| 6,210,276 B1 | 4/2001 | Mullins |
| 6,216,014 B1 | 4/2001 | Proust et al. |
| 6,216,204 B1 | 4/2001 | Thiriet |
| 6,220,510 B1 | 4/2001 | Everett et al. |
| 6,222,914 B1 | 4/2001 | McMullin |
| 6,230,143 B1 | 5/2001 | Simons et al. |
| 6,237,145 B1 | 5/2001 | Narasimhan et al. |
| 6,241,287 B1 | 6/2001 | Best et al. |
| 6,243,687 B1 | 6/2001 | Powell |
| 6,243,688 B1 | 6/2001 | Kalina |
| 6,244,958 B1 | 6/2001 | Acres |
| 6,247,129 B1 | 6/2001 | Keathley et al. |
| 6,266,647 B1 | 7/2001 | Fernandez |
| 6,267,263 B1 | 7/2001 | Emoff et al. |
| 6,269,158 B1 | 7/2001 | Kim |
| 6,279,112 B1 | 8/2001 | O'Toole, Jr. et al. |
| 6,282,516 B1 | 8/2001 | Giuliani |
| 6,292,785 B1 | 9/2001 | McEvoy et al. |
| 6,292,786 B1 | 9/2001 | Deaton et al. |
| 6,296,191 B1 | 10/2001 | Hamann et al. |
| 6,299,530 B1 | 10/2001 | Hansted et al. |
| 6,321,208 B1 | 11/2001 | Barnett et al. |
| 6,375,077 B1 | 4/2002 | Hankins |
| 6,385,723 B1 | 5/2002 | Richards |
| 6,390,374 B1 | 5/2002 | Carper et al. |
| 6,480,935 B1 | 11/2002 | Carper et al. |
| 6,549,773 B1 | 4/2003 | Linden et al. |
| 6,549,912 B1 | 4/2003 | Chen |
| 6,560,581 B1 | 5/2003 | Fox et al. |
| 6,612,490 B1 | 9/2003 | Herrendoerfer et al. |
| 6,681,995 B2 | 1/2004 | Sukeda et al. |
| 6,689,345 B2 | 2/2004 | Jager Lezer |
| 7,104,446 B2 * | 9/2006 | Bortolin et al. ................ 235/383 |
| 7,350,702 B2 * | 4/2008 | Bortolin et al. ................ 235/383 |
| 7,367,501 B2 * | 5/2008 | Bortolin et al. ................ 235/383 |
| 7,654,451 B2 * | 2/2010 | Bortolin et al. ................ 235/380 |
| 7,900,831 B2 * | 3/2011 | Bortolin et al. ................ 235/380 |
| 2002/0002468 A1 | 1/2002 | Spagna et al. |
| 2002/0059584 A1* | 5/2002 | Ferman et al. ................... 725/34 |
| 2002/0076051 A1 | 6/2002 | Nii |
| 2008/0121697 A1 | 5/2008 | Bortolin et al. |
| 2008/0121698 A1 | 5/2008 | Bortolin et al. |

FOREIGN PATENT DOCUMENTS

| | | |
|---|---|---|
| BE | 1002756 | 5/1991 |
| CA | 2293944 | 8/2000 |
| CA | 2267041 | 9/2000 |
| CA | 2317138 | 1/2002 |
| DE | 19522527 | 1/1997 |
| DE | 19848712 | 4/2000 |
| DE | 19960978 | 8/2000 |
| DE | 10015103 | 10/2000 |
| EP | 0203424 | 12/1986 |
| EP | 0292248 | 11/1988 |
| EP | 0475837 | 3/1992 |
| EP | 0540095 | 5/1993 |
| EP | 0658862 | 6/1995 |
| EP | 0675614 | 10/1995 |
| EP | 0682327 | 11/1995 |
| EP | 0875841 | 11/1998 |
| EP | 2772957 | 6/1999 |
| EP | 0936530 | 8/1999 |
| EP | 0938050 | 8/1999 |
| EP | 0938051 | 8/1999 |
| EP | 0944007 | 9/1999 |
| EP | 0949595 | 10/1999 |
| EP | 0982692 | 3/2000 |
| EP | 0984404 | 3/2000 |
| EP | 2793048 | 11/2000 |
| EP | 1085395 | 3/2001 |
| EP | 1102320 | 5/2001 |
| EP | 1111505 | 6/2001 |
| EP | 1113387 | 7/2001 |
| EP | 1113407 | 7/2001 |
| EP | 1168137 | 1/2002 |
| EP | 1233333 | 8/2002 |
| FR | 2794543 | 12/2000 |
| FR | 2796176 | 1/2001 |
| FR | 2804234 | 7/2001 |
| GB | 2331381 | 5/1999 |
| GB | 2343091 | 4/2000 |
| GB | 2351379 | 12/2000 |
| GB | 2355324 | 4/2001 |
| JP | 2000-112864 | 4/2000 |
| JP | 2000-181764 | 6/2000 |
| JP | 2001-202484 | 7/2001 |
| JP | 2001-236232 | 8/2001 |
| KR | 0039297 | 5/2001 |
| KR | 0044823 | 6/2001 |
| KR | 0058742 | 7/2001 |
| KR | 0021237 | 3/2002 |
| WO | WO 90/16126 | 12/1990 |
| WO | WO 96/25724 | 8/1996 |
| WO | WO 96/38945 | 12/1996 |
| WO | WO 96/42109 | 12/1996 |
| WO | WO 97/05582 | 2/1997 |
| WO | WO 97/10562 | 3/1997 |
| WO | WO 97/39424 | 10/1997 |
| WO | WO 98/02834 | 1/1998 |
| WO | WO 98/09257 | 3/1998 |
| WO | WO 98/20465 | 5/1998 |
| WO | WO 98/43169 | 10/1998 |
| WO | WO 98/43212 | 10/1998 |
| WO | WO 98/52153 | 11/1998 |
| WO | WO 99/10824 | 3/1999 |
| WO | WO 99/16030 | 4/1999 |
| WO | WO 99/19846 | 4/1999 |

| | | | | | | |
|---|---|---|---|---|---|---|
| WO | WO 99/44172 | 9/1999 | | WO | WO 01/44900 | 6/2001 |
| WO | WO 99/45507 | 9/1999 | | WO | WO 01/44949 | 6/2001 |
| WO | WO 99/49415 | 9/1999 | | WO | WO 01/47176 | 6/2001 |
| WO | WO 99/49426 | 9/1999 | | WO | WO 01/50229 | 7/2001 |
| WO | WO 00/39714 | 7/2000 | | WO | WO 01/52575 | 7/2001 |
| WO | WO 00/46665 | 8/2000 | | WO | WO 01/55955 | 8/2001 |
| WO | WO 00/54507 | 9/2000 | | WO | WO 01/59563 | 8/2001 |
| WO | WO 00/57315 | 9/2000 | | WO | WO 01/61620 | 8/2001 |
| WO | WO 00/57613 | 9/2000 | | WO | WO 01/65545 | 9/2001 |
| WO | WO 00/62265 | 10/2000 | | WO | WO 01/67694 | 9/2001 |
| WO | WO 00/62472 | 10/2000 | | WO | WO 01/71648 | 9/2001 |
| WO | WO 00/67185 | 11/2000 | | WO | WO 01/71679 | 9/2001 |
| WO | WO 00/68797 | 11/2000 | | WO | WO 01/73530 | 10/2001 |
| WO | WO 00/68902 | 11/2000 | | WO | WO 01/73533 | 10/2001 |
| WO | WO 00/68903 | 11/2000 | | WO | WO 01/78020 | 10/2001 |
| WO | WO 00/69183 | 11/2000 | | WO | WO 01/80563 | 10/2001 |
| WO | WO 00/75775 | 12/2000 | | WO | WO 01/84377 | 11/2001 |
| WO | WO 00/77750 | 12/2000 | | WO | WO 01/84474 | 11/2001 |
| WO | WO 01/04851 | 1/2001 | | WO | WO 01/84512 | 11/2001 |
| WO | WO 01/06341 | 1/2001 | | WO | WO 01/88705 | 11/2001 |
| WO | WO 01/08087 | 2/2001 | | WO | WO 02/06948 | 1/2002 |
| WO | WO 01/13572 | 2/2001 | | WO | WO 02/10962 | 2/2002 |
| WO | WO 01/15397 | 3/2001 | | WO | WO 02/14991 | 2/2002 |
| WO | WO 01/18633 | 3/2001 | | WO | WO 02/15037 | 2/2002 |
| WO | WO 01/18746 | 3/2001 | | WO | WO 02/21315 | 3/2002 |
| WO | WO 01/29672 | 4/2001 | | WO | WO 02/29577 | 4/2002 |
| WO | WO 01/33390 | 5/2001 | | WO | WO 02/088895 | 11/2002 |
| WO | WO 01/40908 | 6/2001 | | | | |
| WO | WO 01/42887 | 6/2001 | | | | |

* cited by examiner

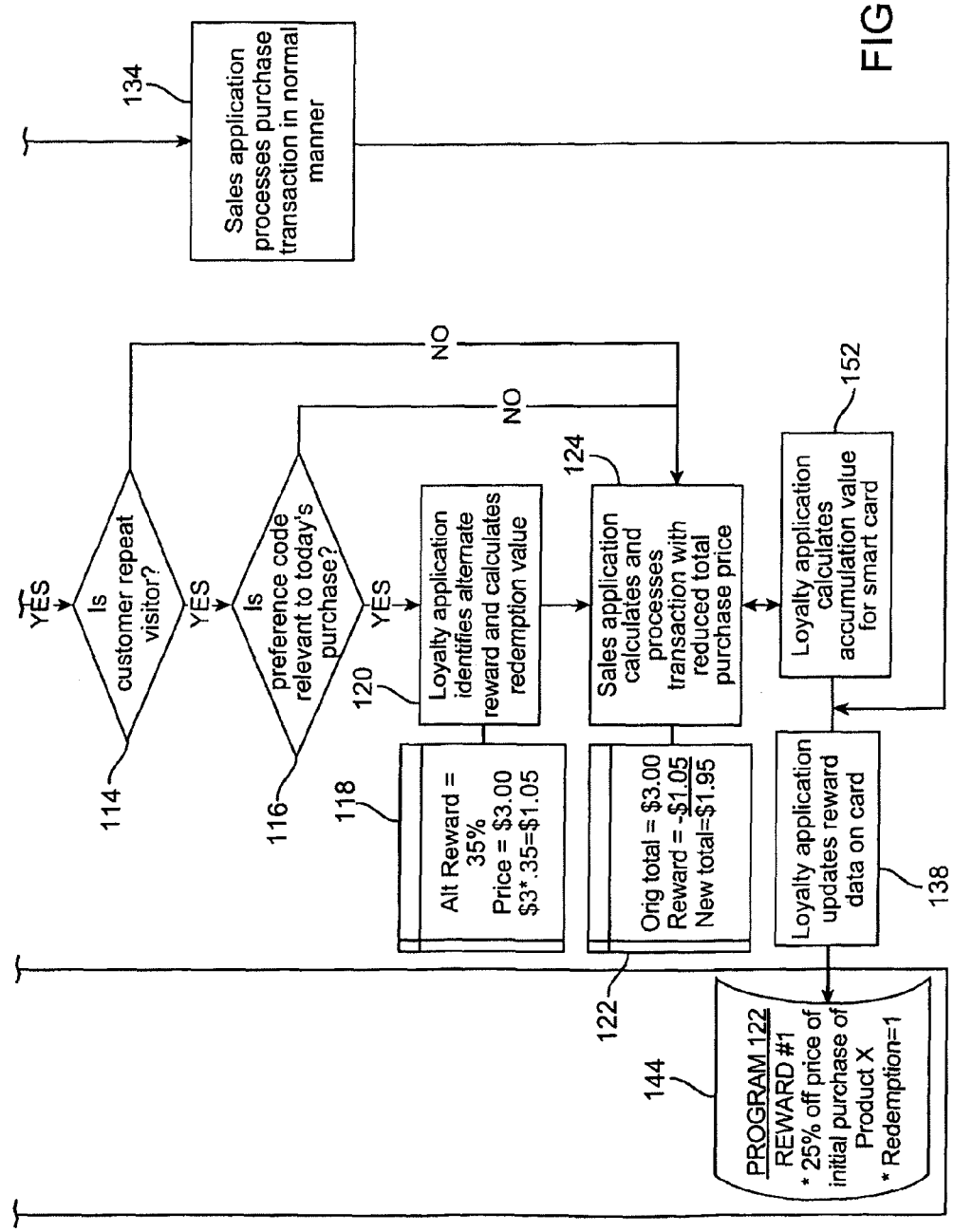
FIG. 4(a)1

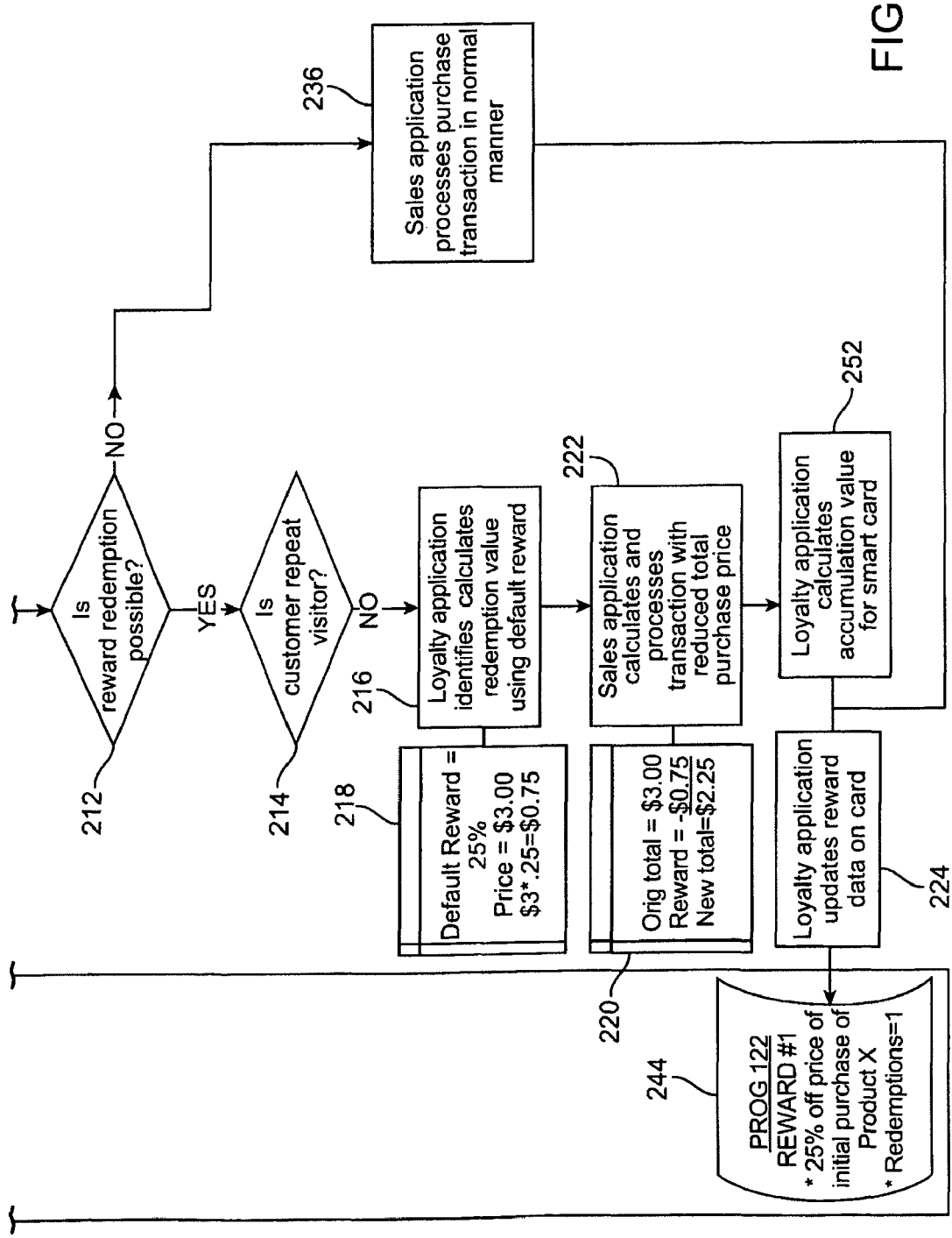
FIG. 4(b)1

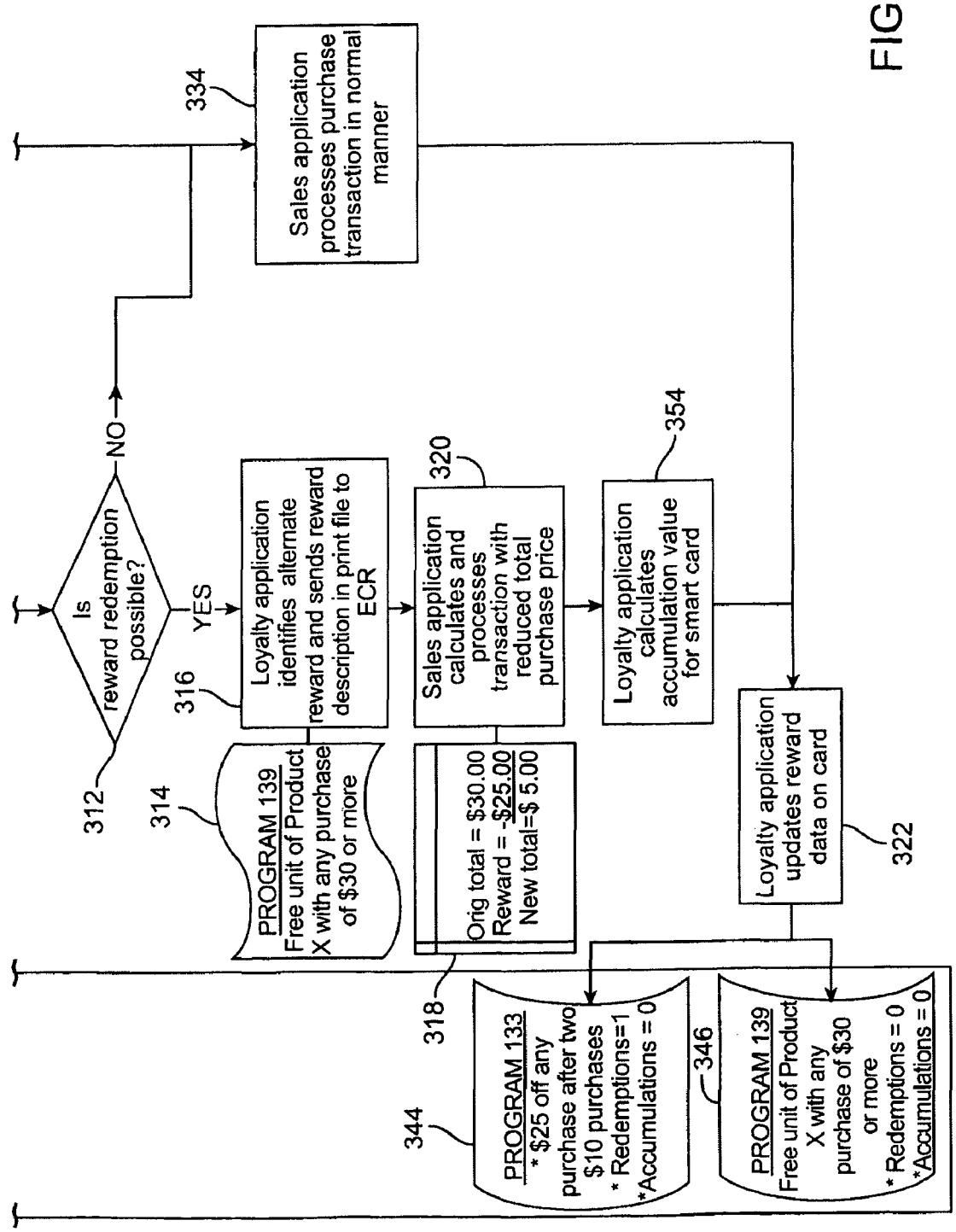
FIG. 5(a)1

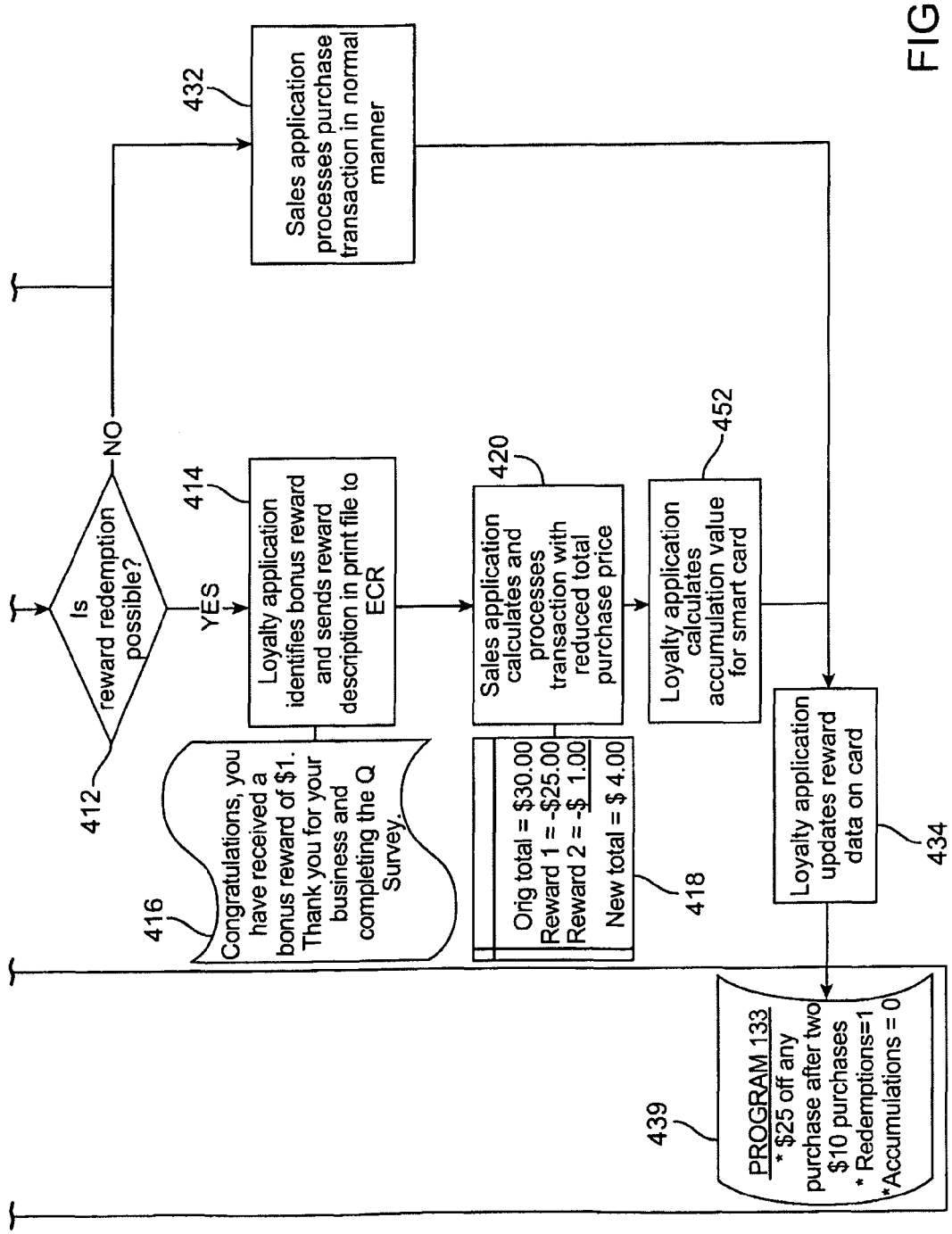
FIG. 5(b)1

METHOD AND SYSTEM USING WILDCARD VALUES

CROSS-REFERENCES TO RELATED APPLICATIONS

This application is a continuation of U.S. patent application Ser. No. 12/640,890, filed on Dec. 17, 2009, which is a continuation of U.S. patent application Ser. No. 11/977,715, filed on Oct. 24, 2007, now U.S. Pat. No. 7,654,451, which is a continuation of U.S. patent application Ser. No. 11/598,954, filed on Nov. 13, 2006, now U.S. Pat. No. 7,367,501, which is a continuation of U.S. patent application Ser. No. 11/491,550, filed on Jul. 20, 2006, now U.S. Pat. No. 7,350,702, which is a continuation of U.S. patent application Ser. No. 10/654,663, filed on Sep. 3, 2003, now U.S. Pat. No. 7,104,446, which are herein incorporated by reference in their entirety for all purposes.

BACKGROUND OF THE INVENTION

Smart cards are used in a variety of financial transactions. For example, smart cards are used in banking and point of sale transactions, loyalty schemes, electronic tolling and electronic ticketing. During a financial transaction, a smart card system uses a card access device to read and write data to a smart card. Hardware and software associated with the card access device are also used to perform the transaction. In some cases, the card access device is in communication with a host system or host. The host system may include a server computer operated by a merchant or an organization affiliated with a merchant (e.g., a credit or debit card company).

A smart card preferably stores as much information about the cardholder as possible. For example, cardholder information such as cardholder passport information, name, address, account number, card expiration date, etc. can be stored electronically in a memory in a smart card. When a consumer uses the smart card, such information can be used to identify the consumer and provide information about the consumer to a particular merchant during a product purchase.

It is also desirable to store cardholder preferences in a memory on the smart card. A cardholder's preferences may be used in a number of ways that can benefit the cardholder. For example, the cardholder's personal preferences can be used to automatically identify what additional goods or services might be offered to the cardholder. For instance, a cardholder may prefer first class seating when flying on an airline. When the cardholder purchases a plane ticket with a smart card having this preference, the cardholder can insert the smart card into an appropriate kiosk for purchasing plane tickets. First class seating choices may be automatically presented to the cardholder before presenting business class or economy seating choices to the cardholder. The cardholder can then use the smart card to purchase a first class plane ticket. Accordingly, preferences that are stored on the smart card can personalize a consumer's transaction.

Preference information, cardholder identification information, and other information can be stored on an EEPROM (electronic erasable programmable read only memory) or other memory in the smart card. However, because the smart card is portable and small, the data storage capacity in the memory in the smart card is limited. Although it would be desirable to store as much information about the cardholder as possible on the smart card, it is not practical to do so. It would be desirable to store as much specific cardholder information in a memory in a smart card, while also minimizing the amount of data stored on the smart card.

It would also be desirable to provide for novel reward and purchasing schemes associated with a portable consumer device such as a smart card.

Embodiments of the invention address these and other problems, individually and collectively.

BRIEF SUMMARY OF THE INVENTION

Embodiments of the invention are directed to portable consumer devices such as smart cards, methods of using portable consumer devices, and systems including portable consumer devices.

One embodiment of the invention is directed to a portable consumer device to be used by a consumer, the portable consumer device comprising: a body; and a computer readable medium coupled to the body, the computer readable medium comprising a data string including one or more wildcard values, wherein the data string is specifically associated with the consumer.

Another embodiment of the invention is directed to a method for using a portable consumer device to be used by a consumer, the method comprising: (a) providing for a portable consumer device comprising a computer readable medium coupled to a body, the computer readable medium comprising a first data string including one or more wildcard values, wherein the first data string is specifically associated with the consumer; (b) retrieving the first data string; (c) comparing the first data string to a second data string; and (d) providing an output after (c).

Another embodiment of the invention is directed to a method comprising: (a) providing for a card comprising a computer readable medium comprising a first data string including one or more wildcard values, wherein the first data string is specifically associated with a purchasing preference of the consumer; (b) retrieving the first data string using a card access device (CAD); (c) comparing the first data string to a second data string, wherein the second data string comprises an identification code for a product that is purchased by the consumer; and (d) after (c), if the first data string encompasses the second data string, informing the consumer that the consumer is entitled to a reward.

These and other embodiments of the invention are described in further detail below with reference to the drawings and the Detailed Description.

BRIEF DESCRIPTION OF THE DRAWINGS

FIG. 4(a) and FIG. 4(a)1 show a flowchart illustrating a method according to an embodiment of the invention.

FIG. 4(b) and FIG. 4(b)1 show a flowchart illustrating a method according to an embodiment of the invention FIG. 5(a) and FIG. 5(a)1 show a flowchart illustrating a method according to an embodiment of the invention.

FIG. 5(b) and FIG. 5(b)1 show a flowchart illustrating a method according to an embodiment of the invention.

Figure 1:
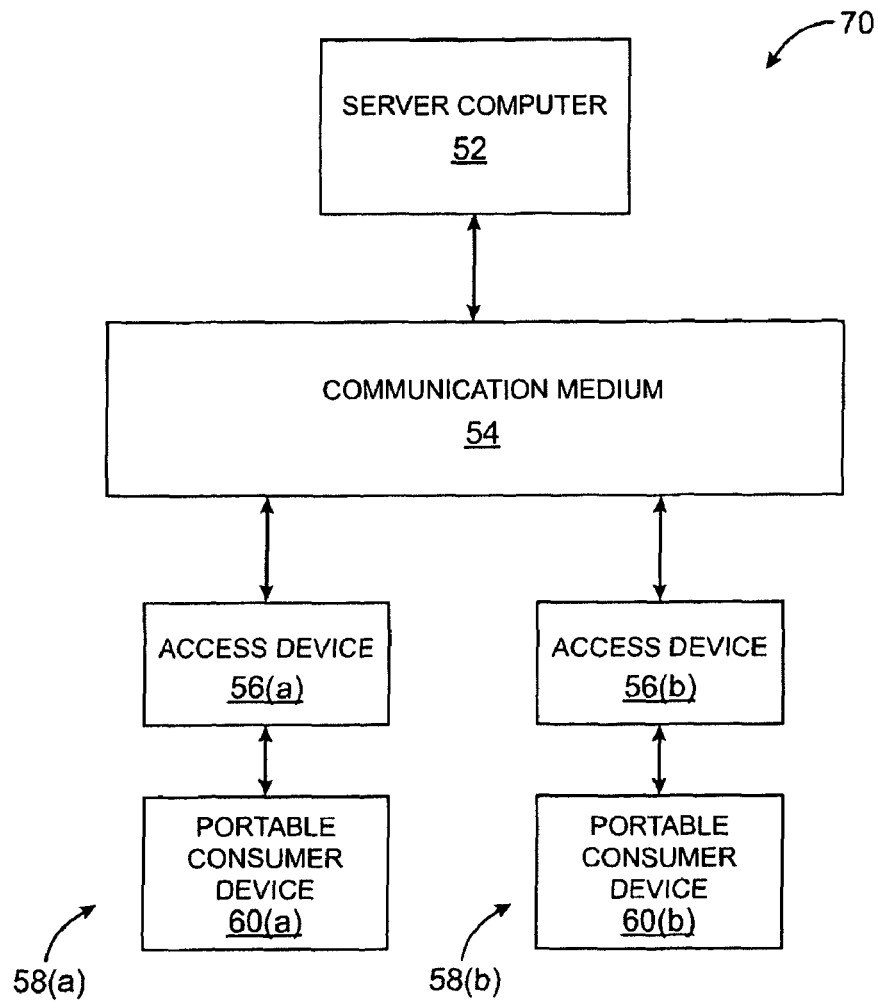
FIG. 1 shows a block diagram of a system according to an embodiment of the invention.

These and other embodiments are described in further detail below with respect to the Detailed Description.

DETAILED DESCRIPTION

Embodiments of the invention are directed to portable consumer devices, methods of using portable consumer devices, and systems using portable consumer devices. The devices, methods, and systems can be used in any suitable environment. For example, embodiments of the invention can be used in retail merchant and service organization payment systems that include a number of "acceptance points." Each acceptance point may accept a portable consumer device such as a smart card. An acceptance point may be a "point of sale" (POS). A point of sale can be a point where a consumer uses the portable consumer device to purchase a good or service. Examples of points of sale include cash registers at stores or restaurants, as well as home computer terminals with access devices that can read and write data to a portable consumer device.

The access devices according to embodiments of the invention can be in any suitable form. Examples of access devices include point of sale (POS) devices, cellular phones, PDAs, personal computers (PCs), tablet PCs, handheld specialized readers, set-top boxes, electronic cash registers (ECRs), automated teller machines (ATMs), virtual cash registers (VCRs), kiosks, security systems, access systems, and the like.

The portable consumer devices according to embodiments of the invention may be in any suitable form. For example, the portable consumer devices can be hand-held and compact so that they can fit into a consumer's wallet and/or pocket (e.g., pocket-sized). For example, the portable consumer devices may include smart cards, ordinary credit or debit cards (with a magnetic strip and without a microprocessor), a keychain device (such as the Speedpass™ commercially available from Exxon-Mobil Corp.), etc. Other examples of portable consumer devices include cellular phones, personal digital assistants (PDAs), pagers, payment cards, security cards, access cards, smart media, transponders, and the like.

Preferably, the portable consumer devices are smart cards. A "smart card" generally refers to a wallet-sized card that includes a microprocessor or microcontroller to store and manage data within the card. A typical smart card includes a microprocessor embedded within or on a planar plastic body that is electrically connected to external electrical contacts on the smart card's exterior. The smart card may also include a computer readable medium such as a programmable read only memory (EEPROM) for storing consumer data. Other computer readable media such as ROM (read only memory) or RAM (random access memory) chips may also be included in the smart card. A ROM chip can be used to store a card operating system. A RAM chip can be used for temporarily storing data in the smart card. Any of these examples of computer readable media may be electrically coupled to the microprocessor.

In embodiments of the invention, one or more data strings with "wildcard" values are stored digitally in a computer readable medium in a portable consumer device. The computer readable medium may be an EEPROM, magnetic stripe, or other memory type device. As used herein, a "wildcard value" includes a symbol that matches any symbol or symbols in a data string. The symbol or symbols encompassed by a wildcard value may include alphanumeric characters.

Illustratively, the data string "0-727&" may be a first data string. The "&" symbol is a wildcard value that may serve as a truncation symbol (thereby representing one or more characters). The first data string would encompass a plurality of second data strings such as "0-727888", "0-7275", "0-727989", etc. In other embodiments, the data string "0-727?8??9" may be a first data string where each "?" represents a wildcard value for a single symbol or character. The first data string would encompass second data strings such as "0-72718229", "0-72738299", etc.

A data string with one or more wildcard values may encompass two or more data strings that represent various items such as goods, services, or loaned products. For example, a data string including one or more wildcard values can represent a range of product identification codes (e.g., universal product codes or UPCs, stock keeping units or SKUs, ISBNs (International Standard Book Numbers), customized product codes, etc.), rather than a single identification code. Accordingly, a single data string including the one or more wildcard values may be used to identify tens or hundreds of items (e.g., hundreds of goods or services), instead of just one item. The identified tens, hundreds, or thousands of items may be within a larger group of items.

Illustratively, the data string "0726$" may be a first data string, where the "$" is a wildcard value representing a single character. The first two digits "07" may indicate that a product is from manufacturer Q, and the second two digits "26" may indicate that the product is a soft drink product. The last digit, represented by "$" may indicate the particular type of soft drink. For example, if the "$" is 1, then the code "07261" may indicate root beer. If the "$" is 2, then the code "07262" may indicate cola, etc.

The one or more data strings with wildcard values can be specifically associated with a particular consumer's characteristics or behavior. This is compared to a data string that would be commonly used for all consumers irrespective of the consumer's characteristics or purchasing behavior. For example, in embodiments of the invention, a data string with one or more wildcard values may indicate a consumer's purchasing behavior with respect to a particular type of good or service. In some embodiments, one or more data strings can be updated (e.g., by a host including a server computer) over time to reflect a consumer's changing preferences or buying habits.

Illustratively, the consumer may have a preference for buying juice made by company X and this preference may be stored on the consumer's portable consumer device as a data string with wildcard values. The data string "38576?" may represent all juices made by company X, where "?" is a wildcard value that represents any number or specific type of alphanumeric values. For example, if company X makes 10 different juices, then there may be 10 different product identification codes for those 10 different juices. For instance, apple juice made by company X may be represented by the data string "3857601", orange juice made by company X may be represented by the data string "3857602", cranberry juice made by company X may be represented by "3857603", etc. In embodiments of the invention, instead of storing 10 different data strings for 10 different types of juices on the consumer's portable consumer device to indicate the consumer's preference for buying juice from company X, only one data string with one or more wildcard values can be stored on the portable consumer device. The consumer's relevant preference is captured electronically and is stored on the portable consumer device in a way that minimizes the amount of data stored on the portable consumer device.

Storing a data string with one or more wildcard values in a portable consumer device has a number of advantages. For example, the storage space on a portable consumer device is limited due to the portable consumer device's size. In some embodiments, the one or more wildcard values stored on a portable consumer device may represent a portion of a product identification code (rather than the full number) identifying a subgroup of products rather than a single product. This reduces the data storage requirements in the portable consumer device.

There are millions of product identification codes in commerce. Because of data storage capacity limits in a portable consumer device, it is generally impractical to store the entire product identification codes for all products relevant to a particular consumer on the consumer's portable consumer device. As illustrated above, embodiments of the invention address this problem and other problems in an effective way.

The data strings with wildcard values can allow a consumer to electronically identify particular preferences at a point of sale (POS). In the example described above, the merchant or organization associated with the merchant may not necessarily be interested in the particular type of juice that the consumer is buying. The merchant or organization associated with the merchant may only be interested in the fact that the consumer buys juice, generally. In this way, new offers or rewards pertinent to juice purchases can be presented to the consumer and it is not necessary to record the complete product identification codes for every single type of juice purchased by the consumer.

The data string including the one or more wildcard values may also be used to identify items that are not to be used by a consumer. For example, the data string including one or more wildcard values may encompass different identification codes for products that a consumer is not allowed to buy. For instance, the consumer may be an adult who is not permitted by buy cigarettes due to health risks. A data string including a wildcard value that encompasses identification codes for cigarettes may be stored on the consumer's portable consumer device. If the consumer tries to purchase cigarettes using the portable consumer device, the access device (or computer coupled to the access device) may inform the consumer that the purchase is not allowed. In these embodiments, the portable consumer devices can be used to restrict the consumer from purchasing or obtaining different items.

The data strings with one or more wildcard values can be used in purchasing transactions and/or reward programs. A "reward" may be anything that benefits the consumer. Examples of rewards include discounts on present or future purchases, coupons, gifts, etc. A "variable reward" is a reward wherein the amount and/or type of reward varies depending upon the particular consumer's characteristics (e.g., the specific consumer's purchasing behavior). This is compared to a standard reward where the reward is the same to each consumer, regardless of the consumer's particular characteristics. Accordingly, in embodiments of the invention, reward sponsors and/or merchant organizations can provide unique rewards for each consumer. The rewards may be customized for the consumer based on pre-determined product preferences or past purchasing behavior.

In some embodiments, when the consumer performs a qualifying transaction and a reward program is invoked, a card acceptance device (CAD) application or website application can query the portable consumer device to obtain the data for consumer preferences from the dynamic data fields in the portable consumer device. These data are then used by the card acceptance device (CAD) application or website application to determine if a standard or non-standard reward accumulation and/or redemption should be processed. If the consumer preference data strings do not indicate a non-standard approach, the card acceptance device (CAD) application or website application determines if a reward accumulation or redemption should occur. Once confirmed, the card acceptance device (CAD) application or the website application processes the reward transaction using a default methodology. If the preference data strings indicate a non-standard approach, the card acceptance device (CAD) application or website application utilizes alternative logic to complete an enhanced reward accumulation and/or redemption.

In a typical reward process, a data string including one or more values may be determined for a particular consumer based on the consumer's past purchasing behavior and the data string may encompass codes for products that the consumer prefers buying. If, for example, the consumer regularly purchases juice at a supermarket, an organization that operates the supermarket or that is affiliated with the supermarket may create a data string that represents the consumer's preference for buying juice. The created data string includes one or more wildcard values and is stored on a computer readable medium in the consumer's portable consumer device. The data string including the one or more wildcard values may encompass the SKU's (stock keeping units) of juices, but not include the SKU's, for example, of cereal. This data string is then stored on the consumer's portable consumer device (e.g., a smart card).

When the consumer makes a subsequent purchase of juice at a point of sale (POS) location such as a supermarket, an access device (or computer coupled to the access device) such as a card access device may use the data string including the one or more wildcard values to indicate that the user has a preference for purchasing juice. Subsequently, the access device or a computer coupled to the access device may present the consumer with an output. The output may be, for example, a coupon that provides a discount on a subsequent juice purchase. The output may alternatively be a discount on the consumer's current purchase, because the consumer made another juice purchase. In each instance, the consumer is rewarded because the consumer exhibits loyalty towards the purchase of juice. The process of rewarding the consumer for purchasing a series of goods or services may be characterized as a "loyalty scheme".

Using this approach, a reward sponsor and/or merchant operator can provide more attractive rewards to priority customers, insuring greater effectiveness in retaining valued customers. Alternatively or additionally, this approach can be used to promote certain products or services to customers that are most likely to purchase them based on past purchase behavior or identified preferences.

The above described methods allow a rewards sponsor and/or merchant to provide consumers with customized rewards at the point of sale (both physical and virtual/website) that are reflective of the consumer's stated preferences or preferences identified via past purchases. As noted above, the use of wildcard values minimizes the storage of extensive amounts of data on a portable consumer device and facilitates the dynamic adjustment of values as each new purchase transaction is completed.

A system according to an embodiment of the invention may include a server computer, an access device, and a communication medium. In some embodiments, a physical point of sale device may be in communication with a host server computer operated by a particular merchant via a communication medium such as the Internet. A central body (e.g., a merchant organization) can establish reward program parameters and can provide a facility for merchants and other participants to download such parameters and terms and conditions to each CAD. In other embodiments, a consumer can use a portable consumer device with a card acceptance device (CAD) that is offline, and is not in communication with a host server computer.

FIG. 1 shows a block diagram of a system 70 according to an embodiment of the invention. The system 70 includes a server computer 52 coupled to access devices 56(a), 56(b) via a communication medium 54. The communication medium 54 may include any suitable electronic data communication medium including wired and/or wireless links. The communication medium 54 may include the Internet.

Computer terminals (not shown) such as personal computers may be between the access devices 56(a), 56(b) and the communication medium 54. The access devices 56(a), 56(b) may be card access devices (CADs) and are respectively at different points of sale 58(a), 58(b). The different points of sale 58(a), 58(b) may include, for example, cash registers in stores, kiosks, etc. Two points of sale 58(a), 58(b) are shown for simplicity of illustration, and embodiments of the invention can have many more points of sale, access devices, etc. The server computer 52 may run a website for a merchant or for an organization associated with the merchant (e.g., a credit card company).

The server computer 52 is typically a powerful computer or cluster of computers. For example, the server computer 52 can be a large mainframe, a minicomputer cluster, or a group of servers functioning as a unit. In one example, the server computer 52 may be a database server coupled to a web server. Moreover, the server computer 52 can behave as a single computer, which services the requests of one or more client computers coupled to or incorporated in the access devices 56(a), 56(b).

At each point of sale 58(a), 58(b), each consumer can use a portable consumer device 60(a), 60(b), which can engage an access device 56(a), 56(b). For example, the access devices 56(a), 56(b) may be card access devices, and the portable consumer devices 60(a), 60(b) may be smart cards. The smart cards can be inserted into or pass through a portion of the access devices 56(a), 56(b) to engage them. Each access device 56(a), 56(b) can read or write data (such as the data strings with one or more wildcard values) to a computer readable medium in a portable consumer device 60(a), 60(b).

Each portable consumer device 60(a), 60(b) can be uniquely associated with a different consumer. For example, each portable consumer device 60(a), 60(b) could be a smart card that is used by a particular consumer. Each portable consumer device 60(a), 60(b) may have data specifically associated with each consumer on it. For example, each portable consumer device 60 may be embossed with a consumer's account number, a consumer's name, a consumer's address, etc. This information can also be stored electronically in the portable consumer device 60.

Software applications may reside in or provide support to the access devices 56(a), 56(b) or a website run on the server computer 52. The software applications may be created using any suitable programming language. A set of variable parameters can be used by an application residing on the access devices 56(a), 56(b) or the server computer 52 to determine when rewards are accumulated or redeemed if a qualifying purchase transaction is conducted by a consumer. These parameters can be downloaded and updated from a central host system including the server computer 52.

Another software component that can be included in the system 70 is within an applet (or other type of program) stored on the portable consumer device 60(a), 60(b) (e.g., smart card, etc.). This component includes a dynamic data field that is updated each time the corresponding rewards programs accumulate or redeem a reward. This component can also be modified or updated based on consumer identification of product preferences (via a separate software application and card access device (CAD) connected to a kiosk or other computer). These values represent past behaviors and specific consumer product preferences that can be used to customize future reward redemption and accumulation.

Figure 2:
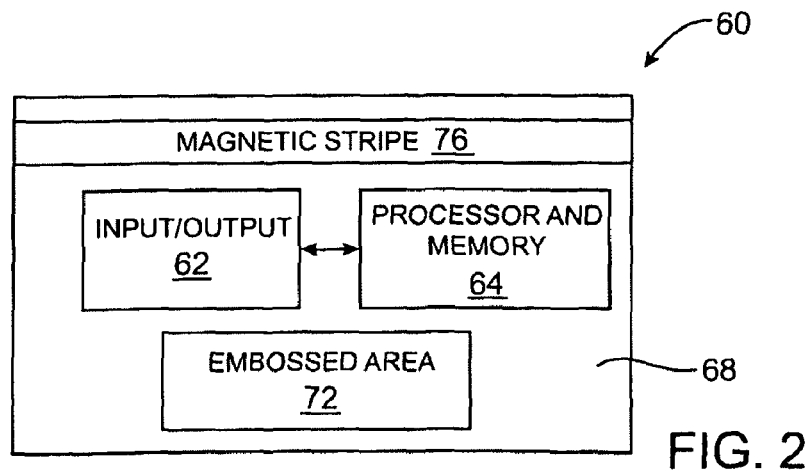
FIG. 2 shows a schematic drawing of a portable consumer device in the form of a card.

A schematic diagram of a portable consumer device 60 in the form of a smart card is shown in FIG. 2. FIG. 2 shows a portable consumer device 60 including a body 68 comprising plastic. The body 68 may be planar and supports a processor and memory 64 as well as input/output terminals 62. The processor and memory 64 may be embedded in or mounted on the body 68. The input/output terminals 62 provide data input and output to the processor and memory 64. An embossed area 72 is also in the body 68 and may include the consumer's name, expiration date of the portable consumer device 60, etc. A magnetic stripe 76 like those found in ordinary credit cards may also be present in the portable consumer device 76. The magnetic stripe 76 and/or the memory in the processor and memory 64 may constitute a computer readable medium in which one or more data strings, each including one or more wildcard values may be stored. If the portable consumer device 76 is a smart card, it may store financial or identification information, and may be a device that conforms to ISO standard 7816, or other smart card standard.

Figure 3:
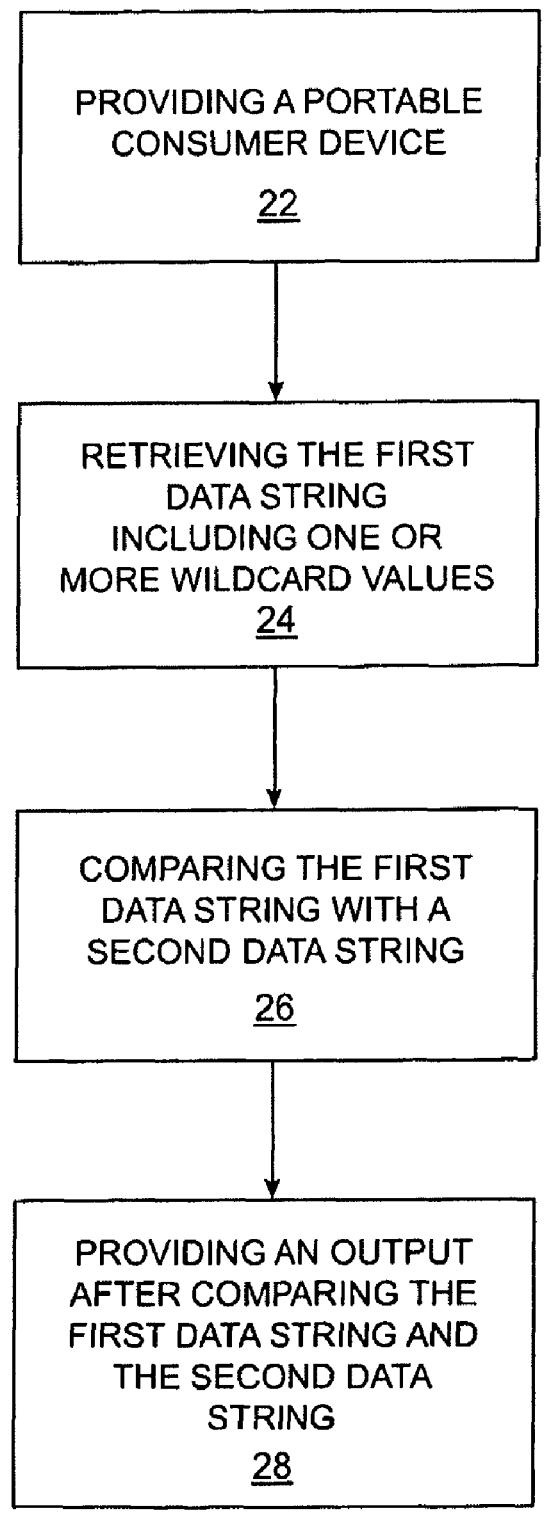
FIG. 3 shows a flowchart illustrating a method according to an embodiment of the invention.

FIG. 3 shows a flowchart including a general method according to an embodiment of the invention. As shown in the flowchart, the method includes providing a portable consumer device (step 22). Initially, a first data string including one or more wildcard values may be provided by the server computer 52 to the portable consumer device. After the portable consumer device is provided to the consumer, the first data string including one or more wildcard values may be retrieved from a computer readable medium in the portable consumer device (step 24). A card access device (CAD) or other access device may retrieve the first data string. Once obtained, the card access device may then compare the first data string with one or more second data strings (step 26). The one or more second data strings may include identification codes for different products. For example, if the consumer is purchasing a product such as a can of soup, the identification code (e.g., the SKU) for that product can form a second data string, which can be input into a card access device so that it can determine if the first data string encompasses the second data string. A computer coupled to the card access device could alternatively perform this function. As is known in the art, a scanner can be used to scan the identification code on the product and the identification code can be electronically input into the computer or the card access device. Before or after the product identification code is scanned and input, the card access device can read the first data string including one or more wildcard values that is stored on the portable consumer device. The card access device can then compare the first data string with the one or more wildcard values to the second data string corresponding to the product identification code (step 26).

An output can then be provided to the consumer (step 28) after the comparison is made. For example, an audio or visual output informing the consumer that the consumer has received a discount on the present purchase can be provided. The audio or visual output may be a reward output that rewards the consumer for purchasing a particular good or service.

Specific examples of exemplary methods are provided in the following examples. Examples 1 and 2 are described with reference to FIGS. 4(a), 4(a)1, 4(b), 4(b)1, 5(a), 5(a)1, 5(b) and 5(b)1.

Example 1

Figure 4A:
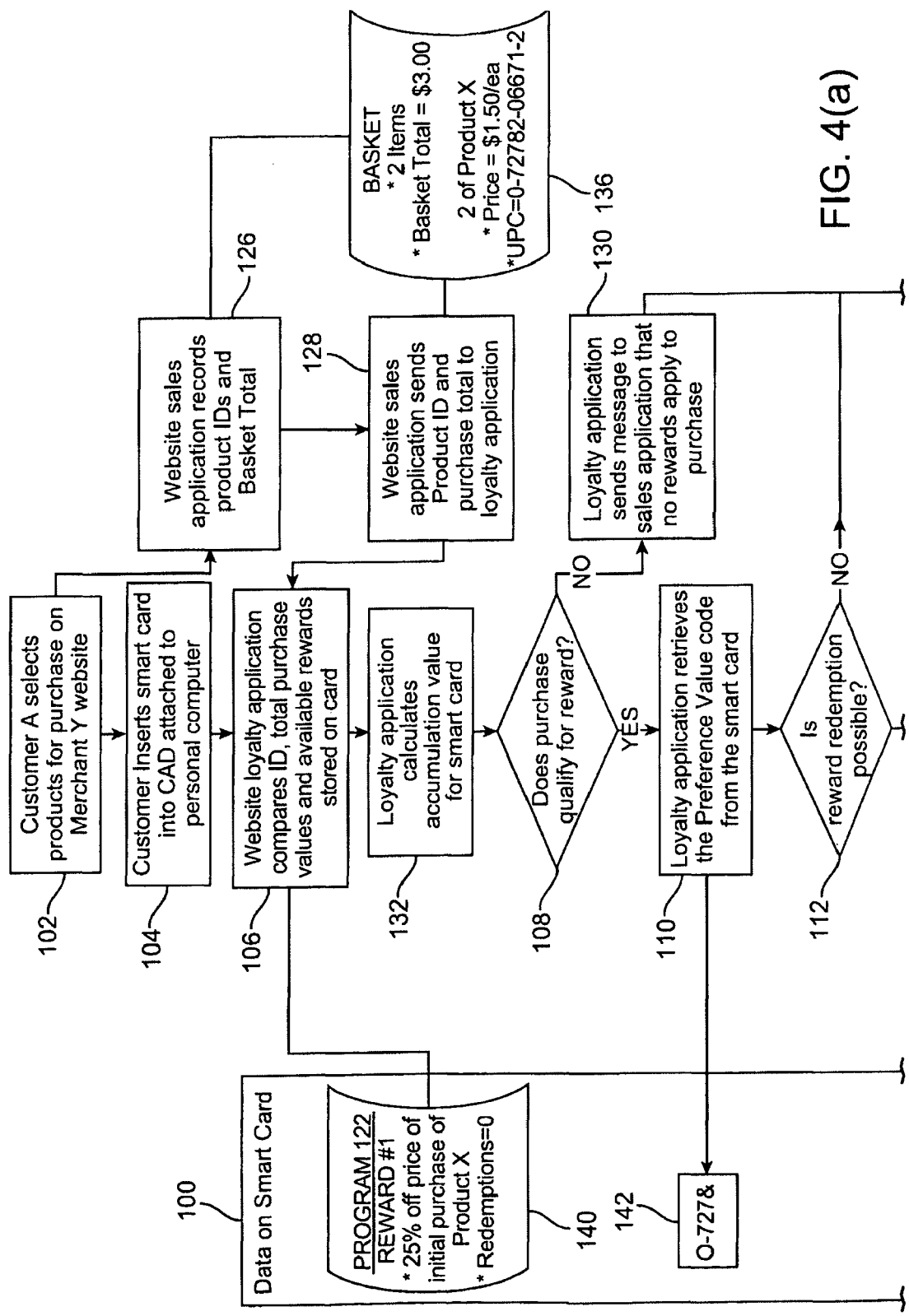
Figure 4B:
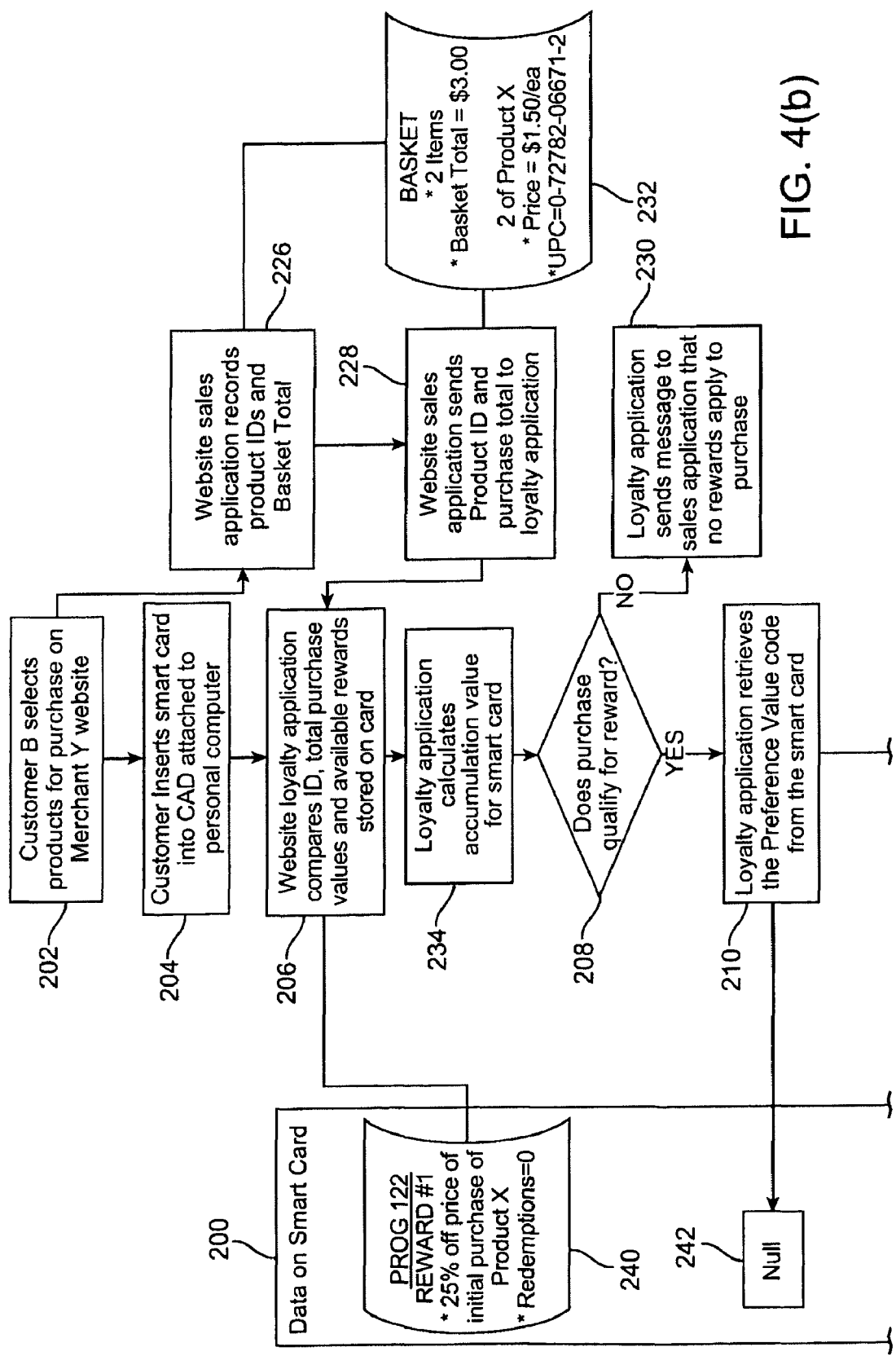

FIGS. 4(a), 4(a)1, 4(b) and 4(b)1 are flowcharts which show how two different customers with two different purchasing histories may use embodiments of the invention. FIG. 4(a) is associated with Customer A and FIG. 4(b) is associated with Customer B. The two customers, Customer A and Customer B, purchase products on a website using a card access device (CAD) attached to a personal computer in communication with a merchant's server computer.

Referring to FIGS. 4(a) and 4(b), Customer A makes a purchase of two units of Product X (UPC code 0-72782-08871-2) using his smart card at Merchant Y's website (102 in FIG. 4(a)). Customer B also makes a purchase of two units of Product X using her smart card at Merchant Y's website (202 in FIG. 4(b)).

A website sales application records product identification codes and provides totals for Customer A's and Customer B's shopping baskets (126, 226). An output (audio or visual) including the number of products in the basket, the price and name of each product, as well as the product identification codes for each product (e.g., UPC codes) can be provided (136, 232) for each customer.

Both smart cards (100, 200) contain an electronic coupon (140, 240) for a discount off the first purchase of Product X with the default discount set at 25%. In each case, the smart cards (100, 200) show that "Redemptions=0", which indicates that the customers have not redeemed any rewards. Customer A is a repeat visitor that has made numerous purchases of other similar products at this website and has a preference data string of "0-727&". This preference data string indicates past purchases and a preference for a particular product group (142 in FIG. 4(a)). Customer B is a first time visitor to the website and has a null preference stored on her smart card (242 in FIG. 4(b)).

Both Customer A and Customer B insert their smart cards into a CAD attached to a personal computer (104, 204). A website sales application then sends the product identification information and purchase total to a loyalty application (128, 228). The website loyalty application compares the customer identification information, total purchase value, and available rewards stored on the smart card (106, 206), and then makes a determination as to whether the customer is entitled to a reward (108, 208). If no, then the loyalty application sends a message to the sales application that no rewards apply to the purchase (130, 230). If yes, then the loyalty application determines that both purchase transactions are eligible for a reward and queries the variable field within the smart card to identify the relevant preference data string for each card (110, 210).

After retrieving the preference data strings (110, 210), the loyalty application determines if a reward redemption is possible (112, 212). If a reward redemption is not possible, then the loyalty application calculates an accumulation value for a smart card (132, 234), and the sales application may process the purchase transaction in a normal manner (134, 236). If a reward redemption is possible, the loyalty application determines if the customer is a repeat customer (114, 214).

Referring to FIG. 4(a)1, if the customer is not a repeat customer, then there is no prior preference data string and the sales application calculates and processes the transaction with a reduced total purchase price (124). If the preference data string is relevant to the current purchase (116), the loyalty application identifies an alternate reward and calculates a redemption value (120).

In this example, since Customer A's preference data string is set at "0-727&" (142), the website application logic applies an alternative discount of 35% to the purchase value of both units of Product X (118). The sales application then calculates and processes the transaction with a reduced total purchase price (124, 122). The sales application displays a message to Customer A indicating that the reward has been enhanced due to his loyal use of the merchant website and products.

Referring to FIGS. 4(b) and 4(b)1, since Customer B's preference data string is null (242), the website application completes the calculation and reward processing using a default discount of 25% (216, 218). The sales application calculates and processes the transaction with a reduced total purchase price (220, 222).

Referring to both FIGS. 4(a)1 and 4(b)1, after the sales application calculates and processes the transaction with the reduced total purchase price (124, 222), a loyalty application updates the reward data on the smart card (138, 224). When Customer A and Customer B use their smart cards the next time, the smart cards will have updated reward data on their smart cards (144, 244).

As illustrated by this example, different customers can have different preference data strings on their respective smart cards. The preference data strings have been created based on each customer's past purchasing behavior. These different data strings can be used to provide different rewards for different customers, based on each customer's particular loyalty towards a particular product or service. By using the preference data strings (142, 242), these functions can be performed while minimizing the data stored on the smart cards (100, 200).

Example 2

Figure 5A:
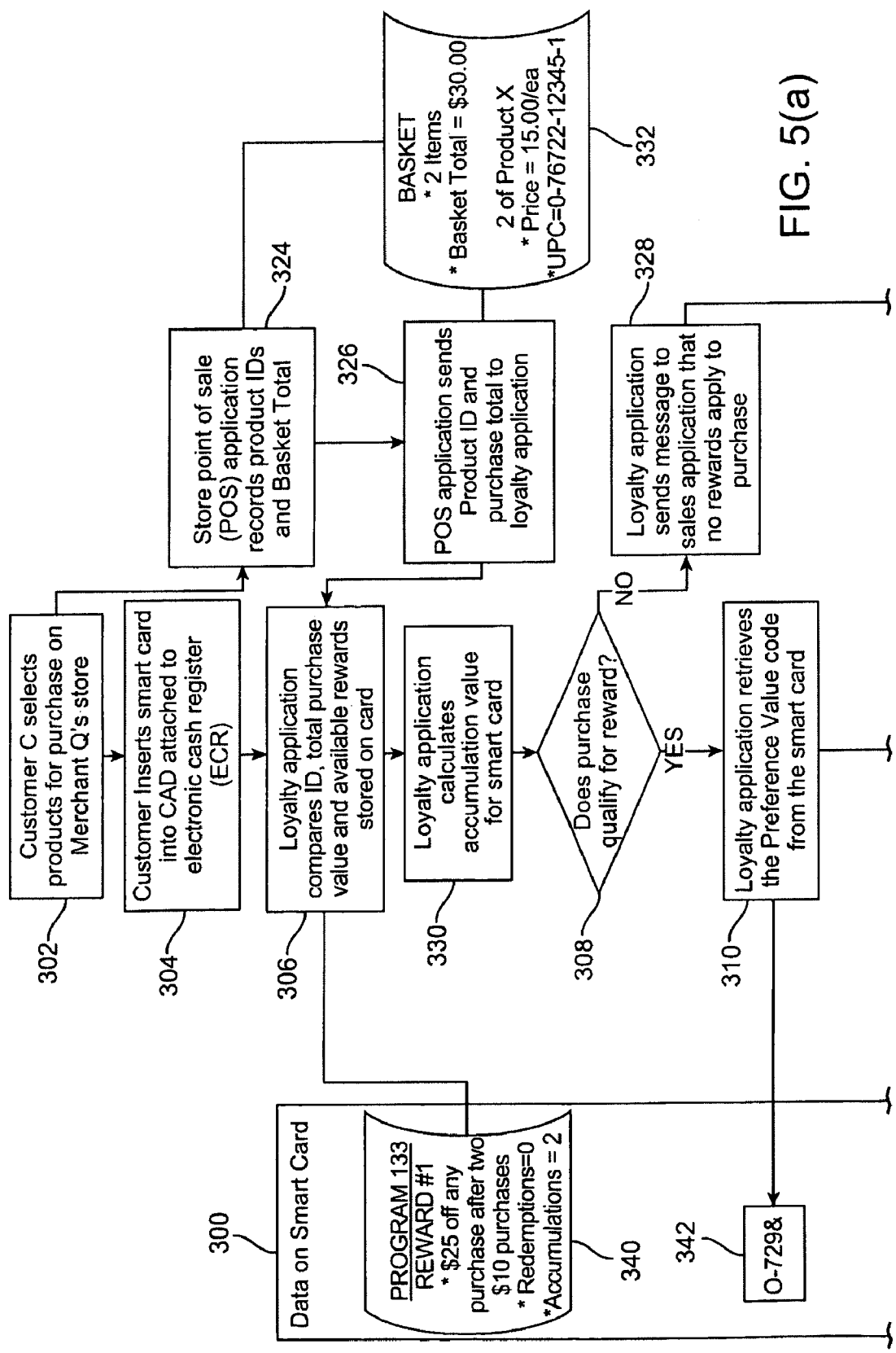
Figure 5B:
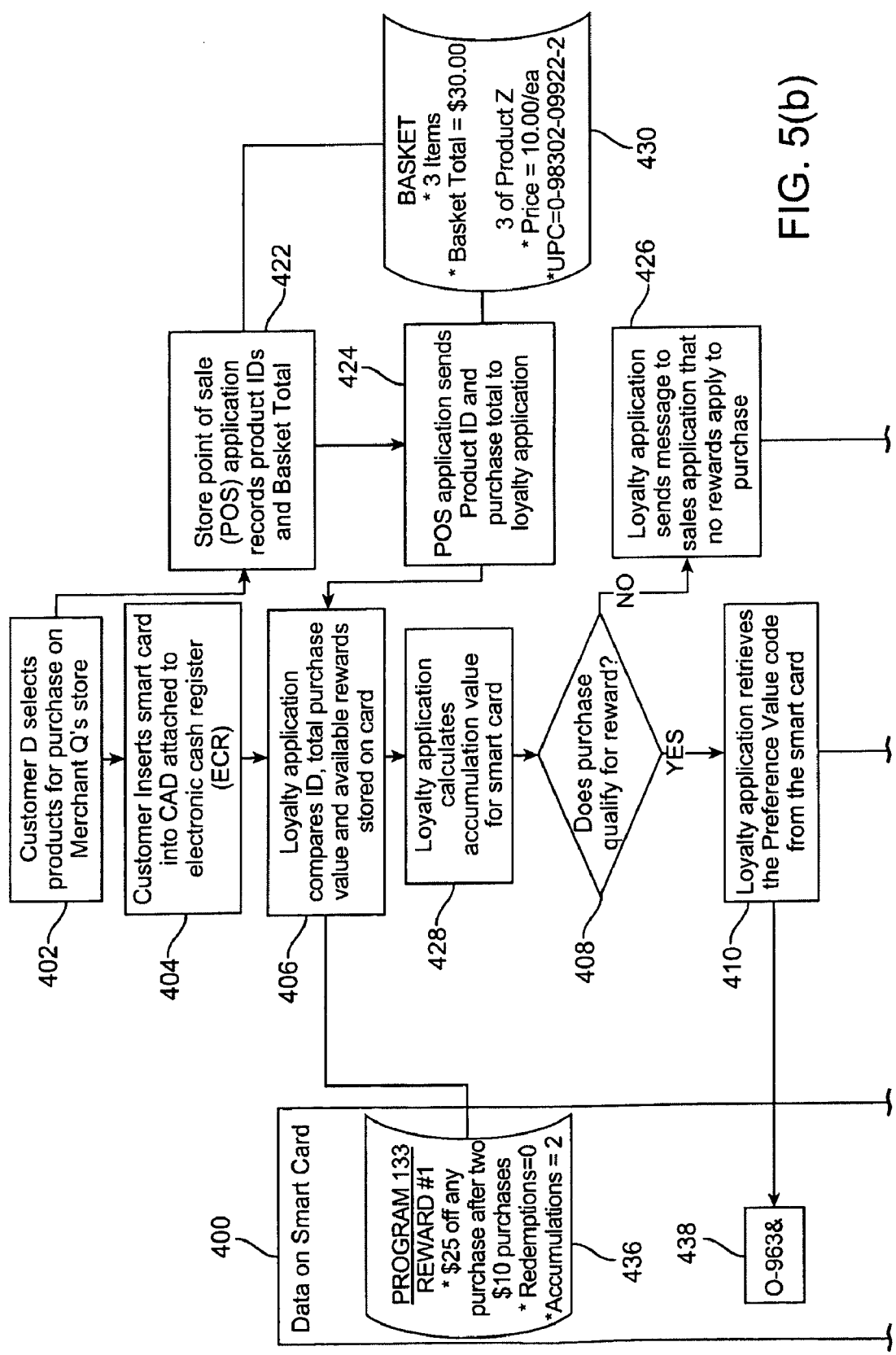

FIGS. 5(a), 5(a)1, 5(b) and 5(b)1 are flowcharts, which show how two different customers with two different purchasing histories may use embodiments of the invention. FIGS. 5(a) and 5(a)1 are associated with Customer C and FIGS. 5(b) and 5(b)1 are associated with Customer D. The two customers, Customer C and Customer D, purchase products at a store run by Merchant Q using a card access device (CAD) attached to an electronic cash register (ECR). In this example, a server computer is not used.

Referring to FIGS. 5(a), 5(a)1, 5(b) and 5(b)1, Customer C and Customer D each make a purchase totaling $30 using their smart cards at a store operated by Merchant Q (302, 402). A store point of sale application records the product identification codes and provides a basket total (324, 422). An output indicating the purchase may be provided for each customer (332, 430).

To pay for their purchases, both Customer C and Customer D insert their smart cards into a CAD attached to an electronic cash register (ECR) (304, 404). Each smart card (300, 400) contains an electronic reward program providing a $25 discount off any purchase over $25 once two prior purchases of at least $10 have been completed at Merchant Q (340, 436). In each case, the smart cards (300, 400) show that "Redemptions=0" and "Accumulations=2", which indicates that neither customer has redeemed a reward and that each customer has accumulated 2 rewards.

The loyalty application compares the product IDs, the total purchase value, and the available rewards stored on the smart card (306, 406). A sales application sends the product identification information and the purchase total to the loyalty application (326, 424). The loyalty application then determines if the purchase qualifies for a reward (308, 408).

If the customers do not qualify for a reward, then the loyalty application sends a message to the sales application that no rewards apply to the purchase (328, 426). A sales application can process the transaction in a normal manner (334, 432). If the customers qualify for a reward, the loyalty application retrieves the preference data string code from the smart card (310, 410).

Referring to FIG. 5(a), Customer C previously made two purchases of product X (of at least $10) at Merchant Q and also stopped at a kiosk provided by Merchant Q and completed an electronic survey indicating a preference for rewards relating to electronic products. After completing this survey, a preference data string of "0-729&" was added to his smart card to record this preference and to signify completion of the survey (342).

Referring to FIG. 5(b), Customer D's purchase includes three units of Product Z (UPC code=0-98302-09922-2). Customer D also made two prior purchases (of at least $10) at Merchant Q and also completed the electronic survey indicating a preference for rewards relating to snack food products. At that time, a preference data string of "0-983&" was added to his smart card to record his preference for snack foods and to signify the successful completion of the survey (438).

Referring to both FIGS. 5(a)1 and 5(b)1, the loyalty application determines if the purchase transaction qualifies for the reward redemption (312, 412). If reward redemption is not possible (312, 412), then the loyalty application calculates an accumulation value for the smart card (330, 428). Then, the sales application may process the purchase transaction in a normal manner (334, 423), without giving either Customer C or Customer D a reward.

Reward redemptions are also possible. For Customer C, the loyalty application identifies an alternate reward and sends a reward description in a print file to the ECR (316). The loyalty application calculates a $25 discount and adds a printed offer on the receipt for a free unit of Product X with the next purchase of at least $30 at Merchant Q as a reward for completing the electronic survey (314). The sales application calculates and processes the transaction with a reduction in the total purchase price (318, 320).

For Customer D, the loyalty application identifies a bonus reward and sends a reward description to the ECR (414). The loyalty application further adds a printed message on the receipt informing the customer that the additional discount has been provided as a reward for completing the electronic survey and for making a purchase within the designated "snack foods" product group identified in the survey (416). The loyalty application calculates a $25 discount and adds an additional discount of $1 off the purchase of Product Z (418, 420).

Referring to both FIGS. 5(a)1-5(b)1, after the sales application calculates and processes the transaction with the reduced total purchase price (320, 420) or processes the transaction in a normal manner (334, 432), the loyalty application updates the reward data on the smart card (322, 434). When each of Customers C and D use their smart cards the next time, the smart cards will have the updated reward data to provide for unique rewards again. As shown by blocks 344, 346, and 439 in FIGS. 5(a)1 and 5(b)1, different programs may allow for different rewards.

Example 3

Embodiments of the invention can also be readily applied to other card-based payment programs such as purchasing cards. In existing purchasing card programs, product purchases are limited to "business use products" by prohibiting purchase transactions at merchants with certain merchant-type codes. For example, a purchasing card may be limited to purchases made at Store Y, which primarily sells office supply equipment. This approach, however, does not preclude purchases of non-business use products at merchants with an acceptable merchant-type code and also incorrectly restricts legitimate purchases at merchants than have been mis-coded or that primarily deal in restricted product types (resulting in the assignment of a restricted merchant type code) but also offer acceptable products. For example, an employer may want to issue a purchasing card to an employee that allows the employee to buy only paper products for the employer, and nothing else. The employer may use a purchasing card including the above-described data string including one or more wildcard values to restrict the employee's purchases to only paper products. The employee would be allowed to shop at Store Y (which sells primarily office supplies) for paper products, but would not be allowed by buy office furniture at Store Y. The employee could shop at Store Z for paper products as well. By recording acceptable product type ranges using partial product codes and wildcard values stored on the card, the payment application within a point of sale terminal can determine if any of the products within a customer's purchase fall outside of the permitted product-type groups, providing a more efficient and accurate method of restricting card use. Accordingly, using a portable consumer device including data strings including one or more wildcard values, the customer may be pre-authorized to make specific product purchases, but can be restricted from making other product purchases.

Example 4

Embodiments of the invention can also be readily applied to a card-based Internet screening program that could be used to limit the use of public (or private) computers for Internet browsing. Rather than using a traditional software program that filters all Internet searches based on the same criteria, specific filtering values could be stored on the smart card which would then be used to facilitate access and log-on to the computer. An example of such an implementation would be in a library that offers public access to its computers. The library could issue smart cards as library cards for individuals wishing to use the computers and could encode distinct filter values on the card based on the customer's age or instructions from the customer's parent or guardian or based on library rules. In addition to storing a list of acceptable http extensions (as an example) such as .gov and .org, the library could also use the wildcard values to identify restricted search/key words and phrases (i.e., "&sex&", etc.) without requiring that an extensive list of specific phrases be stored in card memory.

The terms and expressions which have been employed herein are used as terms of description and not of limitation, and there is no intention in the use of such terms and expressions of excluding equivalents of the features shown and described, or portions thereof, it being recognized that various modifications are possible within the scope of the invention claimed. Moreover, any one or more features of any embodiment of the invention may be combined with any one or more other features of any other embodiment of the invention, without departing from the scope of the invention.

Also, it should be understood that the present invention as described above can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software.

All references, patent applications, and patents mentioned above are herein incorporated by reference in their entirety for all purposes. None of them are admitted to be prior art to the presently claimed inventions.

What is claimed is:

1. A computer-implemented method of processing coupons, the method comprising:
   Receiving, by a computer, a coupon in form of a first data string including one or more wildcard values;
   Comparing, by the computer, the first data string to a second data string; and
   Providing, by the computer, a benefit to a consumer based on the comparison.

2. The method of claim 1, wherein the second data string is a Stock Keeping Unit (SKU) associated with a particular product.

3. The method of claim 1, wherein the second data string is an identification code configured to identify a category of products.

4. The method of claim 1, wherein the second data string includes identification code for one or more products.

5. The method of claim 1, further comprising
   determining whether the first data string encompasses the second data string.

6. The method of claim 1, wherein the first data string is received from a portable consumer device.

7. The method of claim 6, wherein the portable consumer device is a payment card.

8. The method of claim 6, wherein the portable consumer device is a cellular phone.

9. The method of claim 1, wherein the benefit is a discount for a product.

10. A server computer comprising a processor and a computer readable medium coupled to the processor, the computer readable medium comprising code for implementing a method comprising:
    receiving a coupon in form of a first data string including one or more wildcard values;
    comparing the first data string to a second data string; and
    providing a benefit to a consumer based on the comparison.

11. The server computer of claim 10, wherein the second data string is a Stock Keeping Unit (SKU) associated with a particular product.

12. The server computer of claim 10, wherein the first data string is received from a portable consumer device.

13. The server computer of claim 10, wherein the benefit is a discount for a product.

14. The server computer of claim 10, wherein the second data string includes identification code for one or more products.

15. A method for using coupon comprising:
    presenting a coupon, to a computer system, in form of a first data string including one or more wildcard values, wherein the first data string is stored in a portable consumer device; and
    receiving benefit after a comparison is made, by the computer system, between the first data string and a second data string.

16. The method of claim 15, wherein the second data string is a Stock Keeping Unit (SKU) associated with a particular product.

17. The method of claim 15, wherein the second data string is an identification code configured to identify a category of products.

18. The method of claim 15, wherein the portable consumer device is a payment card.

19. The method of claim 15, wherein the portable consumer device is a cellular phone.

20. The method of claim 15, wherein the benefit is a discount for a product.

* * * * *

UNITED STATES PATENT AND TRADEMARK OFFICE
CERTIFICATE OF CORRECTION

| | | |
|---|---|---|
| PATENT NO. | : 8,141,777 B2 | Page 1 of 1 |
| APPLICATION NO. | : 13/019244 | |
| DATED | : March 27, 2012 | |
| INVENTOR(S) | : Corinne Bortolin et al. | |

It is certified that error appears in the above-identified patent and that said Letters Patent is hereby corrected as shown below:

In the claims

In Claim 1 in Column 13, line 4 replace "Receiving, by a computer, a coupon in form of a first data" with --receiving, by a computer, a coupon in a form of a first data--

In Claim 1 in Column 13, line 6 replace "Comparing, by the computer" with --comparing, by the computer--

In Claim 1 in Column 13, line 8 replace "Providing, by the computer" with --providing, by the computer--

In Claim 4 in Column 13, line 17 replace "includes identification code for one or more products." with --includes an identification code for one or more products.--

In Claim 10 in Column 13, line 33 replace "receiving a coupon in form of a first data string including" with --receiving a coupon in a form of a first data string including--

In Claim 14 in Column 14, lines 11-12 replace "includes identification code for one or more products." with --includes an identification code for one or more products.--

In Claim 15 in Column 14, line 14 replace "presenting a coupon, to a computer system, in form of a" with --presenting a coupon, to a computer system, in a form of a--

In Claim 15 in Column 14, lines 18-19 replace "receiving benefit after a comparison is made, by the computer system," with --receiving a benefit after a comparison is made, by the computer system,--

Signed and Sealed this
Fifteenth Day of December, 2015

Michelle K. Lee
*Director of the United States Patent and Trademark Office*